(12) United States Patent
Euchner et al.

(10) Patent No.: US 7,111,230 B2
(45) Date of Patent: Sep. 19, 2006

(54) SYSTEM AND METHOD FOR ANNOTATING DOCUMENTS

(75) Inventors: James A. Euchner, Waccabuc, NY (US); Jean-Hiram Coffy, Norwalk, CT (US); Andrei Obrea, Seymour, CT (US)

(73) Assignee: Pitney Bowes Inc., Stamford, CT (US)

( * ) Notice: Subject to any disclaimer, the term of this patent is extended or adjusted under 35 U.S.C. 154(b) by 289 days.

(21) Appl. No.: 10/707,582

(22) Filed: Dec. 22, 2003

(65) Prior Publication Data
US 2005/0138541 A1 Jun. 23, 2005

(51) Int. Cl.
*G06F 15/00* (2006.01)

(52) U.S. Cl. .............. 715/512; 715/530; 715/514; 715/751

(58) Field of Classification Search ......... 715/512, 715/751, 530, 514
See application file for complete search history.

(56) References Cited

U.S. PATENT DOCUMENTS

| | | | |
|---|---|---|---|
| 5,453,762 A | 9/1995 | Ito et al. ............ | 345/179 |
| 5,581,682 A * | 12/1996 | Anderson et al. ...... | 715/530 |
| 5,612,720 A | 3/1997 | Ito et al. ............ | 345/179 |
| 5,897,648 A * | 4/1999 | Henderson ........... | 715/530 |
| 6,208,771 B1 | 3/2001 | Jared et al. .......... | 382/306 |
| 6,310,988 B1 | 10/2001 | Flores et al. ......... | 382/313 |
| 6,311,042 B1 | 10/2001 | DeSchrijver .......... | 455/66 |
| 6,327,395 B1 | 12/2001 | Hecht et al. .......... | 382/306 |
| 6,396,598 B1 | 5/2002 | Kashiwagi et al. ..... | 358/474 |
| 6,502,756 B1 | 1/2003 | Fahraeus ............ | 235/494 |
| 6,548,768 B1 | 4/2003 | Pettersson et al. ..... | 178/18.01 |
| 6,570,104 B1 | 5/2003 | Ericson et al. ........ | 178/18.09 |
| 6,573,887 B1 | 6/2003 | O'Donnell, Jr. ....... | 345/179 |
| 6,577,300 B1 | 6/2003 | Picoult et al. ........ | 345/179 |
| 6,586,688 B1 | 7/2003 | Wiebe .............. | 178/18.09 |
| 6,594,406 B1 | 7/2003 | Hecht .............. | 382/306 |
| 6,609,653 B1 | 8/2003 | Lapstun et al. ....... | 235/375 |
| 6,627,870 B1 | 9/2003 | Lapstun et al. ....... | 250/221 |
| 6,681,045 B1 | 1/2004 | Lapstun et al. ....... | 382/187 |
| 6,865,284 B1 * | 3/2005 | Mahoney et al. ...... | 382/112 |
| 2001/0051890 A1 * | 12/2001 | Burgess ............ | 705/9 |
| 2001/0055411 A1 | 12/2001 | Black .............. | 382/124 |
| 2002/0035687 A1 | 3/2002 | Skantze ............. | 713/168 |
| 2002/0054778 A1 * | 5/2002 | Ericson et al. ........ | 400/76 |
| 2002/0057824 A1 | 5/2002 | Andreasson ......... | 382/101 |
| 2002/0078088 A1 * | 6/2002 | Kuruoglu et al. ...... | 707/512 |
| 2002/0107885 A1 | 8/2002 | Brooks et al. ........ | 707/505 |
| 2002/0126105 A1 | 9/2002 | O'Donnell, Jr. ....... | 345/179 |
| 2002/0169986 A1 * | 11/2002 | Lortz .............. | 713/201 |

(Continued)

OTHER PUBLICATIONS

Guimbretiere, Paper Augmented Digital Documents, SIGCHI 2003, Nov. 2-5, 2003, pp. 51-60.*

(Continued)

*Primary Examiner*—Stephen Hong
*Assistant Examiner*—David Faber
(74) *Attorney, Agent, or Firm*—George M. Macdonald; Steven J. Shapiro; Angelo N. Chaclas (57) ABSTRACT

A method and system for collaborative annotation of a master document using a digital pen system is described. At least one hardcopy printout of the master document is printed on digital paper used with a digital pen system. The digital paper is associated with the electronic master document. Using the digital pen, annotations and edits may be made to the hardcopy representation. The digital pen system records the annotations and edits and updates the electronic document automatically.

3 Claims, 9 Drawing Sheets

U.S. PATENT DOCUMENTS

| | | | |
|---|---|---|---|
| 2002/0193975 A1 | 12/2002 | Zimmerman | 703/6 |
| 2003/0001020 A1* | 1/2003 | Kardach | 235/494 |
| 2003/0046256 A1 | 3/2003 | Hugosson et al. | 707/1 |
| 2003/0133629 A1 | 7/2003 | Sayers | 382/313 |
| 2003/0214528 A1 | 11/2003 | Pierce et al. | 345/723 |
| 2004/0139391 A1* | 7/2004 | Stumbo et al. | 715/512 |
| 2004/0205545 A1* | 10/2004 | Bargeron et al. | 715/512 |
| 2004/0250201 A1 | 12/2004 | Caspi | 715/512 |

OTHER PUBLICATIONS

Brush, et al., Notification for Shared Annotation of Digital Documents, CHI 2002, Apr. 20-25, 2002, 4 pages.

Brush, et al., Robust Annotation Positioning in Digital Documents, SIGCHI 2001, Mar. 31-Apr. 4, 2001, 8 pages.

* cited by examiner

530 five (5)
HC 5/28/03 23:10

Article 15
This agreement shall be in force for a period of ten (10) years.

change New York to CT
GMM 5/28/03 23:10

Article 16
This agreement shall be interpreted under the laws of the state of ~~New York.~~
Connecticut

535

JE 5/8/03
09:10

545

Article 17
The effective date of this agreement shall be July 1, 2003.

change date to August 1
AO 5/27/03 10:10

SYSTEM AND METHOD FOR ANNOTATING DOCUMENTS

BACKGROUND OF INVENTION

The illustrative embodiments described in the present application are useful in systems including those for document modification and workflow and more particularly are useful in systems including those for collaborative annotation of documents.

Documents are often created by groups of people that collaborate through iterations of additions, changes and suggestions. Team collaboration is often used when creating or maintaining documents. A principal author may create an original document. Similarly, a principal author may create an initial draft of a document. The principal author typically uses a processing system such as a personal computer with document creation software installed. Once created, the document may be circulated to several team members for annotation. Typically, hardcopy paper printouts are circulated to the team members. The team members then each mark the document as needed and forward the annotations to the principal author or another designated person so that the updates and comments may be processed.

The processing system typically includes a personal computer such as an INTEL PENTIUM® based personal computer using the MICROSOFT WINDOWS XP® Operating system. A physical hardcopy printout of the electronic master version of the document may be created using a laser or inkjet printer. Computer systems are typically used to edit and publish each revision of the document. The documents are often word processor data files used with a word processor and the computer systems typically include word processing programs such as MICROSOFT® WORD® (hereinafter "Word") manufactured by Microsoft Corporation of One Microsoft Way, Redmond, Wash. However, the documents may also include, but are not limited to, business reports, contracts, legal briefs, articles, books, speeches, reports, slide show presentations, financial reports, technical drawings, sales, marketing and advertising materials.

Accordingly, other programs such as VISIO® and POWER-POINT® available from MICROSOFT® may be used. Many additional programs and systems may be used including Computer Aided Design (CAD) systems.

In a traditional document collaboration effort, a principal author or editor creates an original document draft. The copies of the draft are circulated to the group and a member of the group is assigned the task of updating the draft to a new version. The group members typically provide change suggestions or comments by annotating the paper copy and returning it to the editor. The task of updating is usually performed by the principle author or editor and may include adding information, deleting information and/or changing information. There may be many hardcopy comment versions to reconcile and the process may be cumbersome. Furthermore, two or more of the suggestions may present a conflict and the member updating the draft may decide to enter the competing versions as alternatives or resolve the conflict. The process may be iterative as the editor circulates subsequent drafts for comment until the document is finalized.

The draft versions are typically hand-delivered or circulated by mail. More recently, document teams have begun using word-processing systems such as WORD that include some collaborations features. For example, draft versions of WORD documents may be distributed electronically. The team members may enter suggested changes and comments using the Track Changes feature of WORD. The editor then decides which changes to accept. The editing/annotation process may be accomplished in a round-robin fashion, with one single electronic copy circulated to each team member in a serial fashion. Such a system requires that the team members utilize a computer equipped with WORD and may also require that only one team member at a time manually check-out the document to enter suggestions.

Such prior art annotation methods are cumbersome, time-consuming and error-prone when the number of recipients is more than a very small number.

SUMMARY OF INVENTION

The present application describes systems and methods for providing a document annotation manager system for use in team collaboration. Using digital paper, an electronic document is associated with the special digital paper that is used for hardcopy printouts. Each team member may annotate the document using a digital pen. The multiple annotations are then each displayed with the electronic version of the original draft together with an identifier listing the particular team member and a time stamp for the annotation.

A special printer is used to print both the digital paper and the document so that the electronic master document is associated with the printed hardcopy. The printer prints a digital paper identifier such as a carbon based dot pattern to provide a unique pattern space. The printer also prints the hardcopy document on the paper so that the electronic version of the document is associated with that particular pattern space. In an alternative, a traditional printer is used and an association is established between the digital paper and the electronic document.

In another alternative, editing symbols are utilized to process annotations in order to automatically incorporate changes to the electronic master document file. Additionally, a hierarchal permission system is utilized to determine which team members may change the document and which members may only enter comments. Furthermore, if two team members with change authority attempt to change the same paragraph, the changes from the highest-ranking team member are entered and the others are converted into comments.

In another alternative, a digital paper scanner is used when printing the hardcopies in order to associate a particular digital paper identifier with the electronic master document. The digital paper identifier may be a unique pattern space that is scanned by the digital pen. In order to accommodate multiple page documents, each page of the digital paper may use a different pattern space and may be scanned as printed. Alternatively, the digital paper sheets may be provided in sequence and only the first page scanned. In that way, each printed page of the hardcopy document will be associated with a different digital paper pattern space.

In yet another alternative embodiment, the document annotation manager is utilized to audit the performance of a document reviewer such as a person that is grading papers. The system may also be used to audit time records of a professional editor that is reviewing a work. The reviewer is instructed to check passages or paragraphs during the review and the time-stamp subsystem of the annotation manager records the time stamp entries for each annotation as the reviewer proceeds through the document. Accordingly, an audit trail is created that may be manually or automatically audited for compliance with a set of review rules. Additionally, the audit system may be utilized to provide non-repudiated evidence of document review such as by establishing review of financial reports by an audit manager to the satisfaction of the Chief Financial Officer of a large publicly traded corporation.

DETAILED DESCRIPTION

Illustrative embodiments describing systems and methods for the collaborative annotation of documents are described. The illustrative embodiments are described with reference to the collaborative annotation of a single page legal document, but may be applied to other applications including multi-page documents.

Digital pens allow a user to capture or digitize handwriting or pen strokes that the user writes on a medium such as a piece of paper by using a processor such as a personal computer. Digital pen systems include the Sony-Ericsson CHA-30 CHATPEN and ANOTO paper available from Anoto AB of Sweden. The CHATPEN utilizes a BLUETOOTH transceiver in order to communicate with a local processor. The ANOTO paper includes a grid for encoding position information that is detected by the CHATPEN. Additional information may be captured including information related to pressure, speed and pen attitude. The additional information includes biometric information that may be used to identify or authenticate a particular user.

The ANOTO digital paper is encoded with a dot pattern that allows an ANOTO system to track a CHATPEN on the digital paper. The CHATPEN includes a camera that recognizes the dot pattern and resolves it to a pattern location. The CHATPEN sends pen stroke data, position data and biometric data to an application. Typically, the CHATPEN uses a BLUETOOTH transceiver and a local co-processor attached to a network such as the Internet to send position data to an ANOTO Pattern Lookup Service (PLS). The PLS associates the particular pattern location with an application URL and sends the data to the user application. The ANOTO user application described herein is an annotation manager service. Typical ANOTO applications associate a pattern space with a generic function such as a memo pad. A Notepad application on the local notebook computer of the user then receives digital pen input associated with that generic application. However, such systems do not associate a particular instance of an electronic document with a portion of the pattern space.

A System for Paper Identification Information to Associate a Printed Application With an Electronic Application is described in U.S. Published Patent Application No. US 2003/0001020A1 by James P. Kardach. The system described therein uses identification information printed in a corner of the hardcopy representation at a location that does not include any portion of the printed pattern. The pen is said to process the identification information to associate the generic pattern with a particular hardcopy representation.

Annotation Manager System

In an illustrative embodiment of the present application, a system for managing document annotations is described. The system utilizes an ANOTO CHATPEN digital pen system and paper including an ANOTO pattern. However, other digital pen systems may also be utilized.

The illustrative systems and methods described provide a document annotation manager system for use in team collaboration. Using digital paper, an electronic document is associated with the special digital paper and hardcopy printouts are created using the digital paper. Each team member may annotate the document using a digital pen. The multiple annotations are then each displayed with the electronic version of the original draft together with an identifier for the particular team member and a time stamp for the annotation.

In an illustrative embodiment, a special printer is used to print both the digital paper and the document so that the electronic master document is associated with the printed hardcopy. The printer prints a digital paper identifier such as a carbon based dot pattern to provide a unique pattern space. The printer also prints the hardcopy document on the paper so that the electronic version of the document is associated with that particular pattern space.

Figure 1:
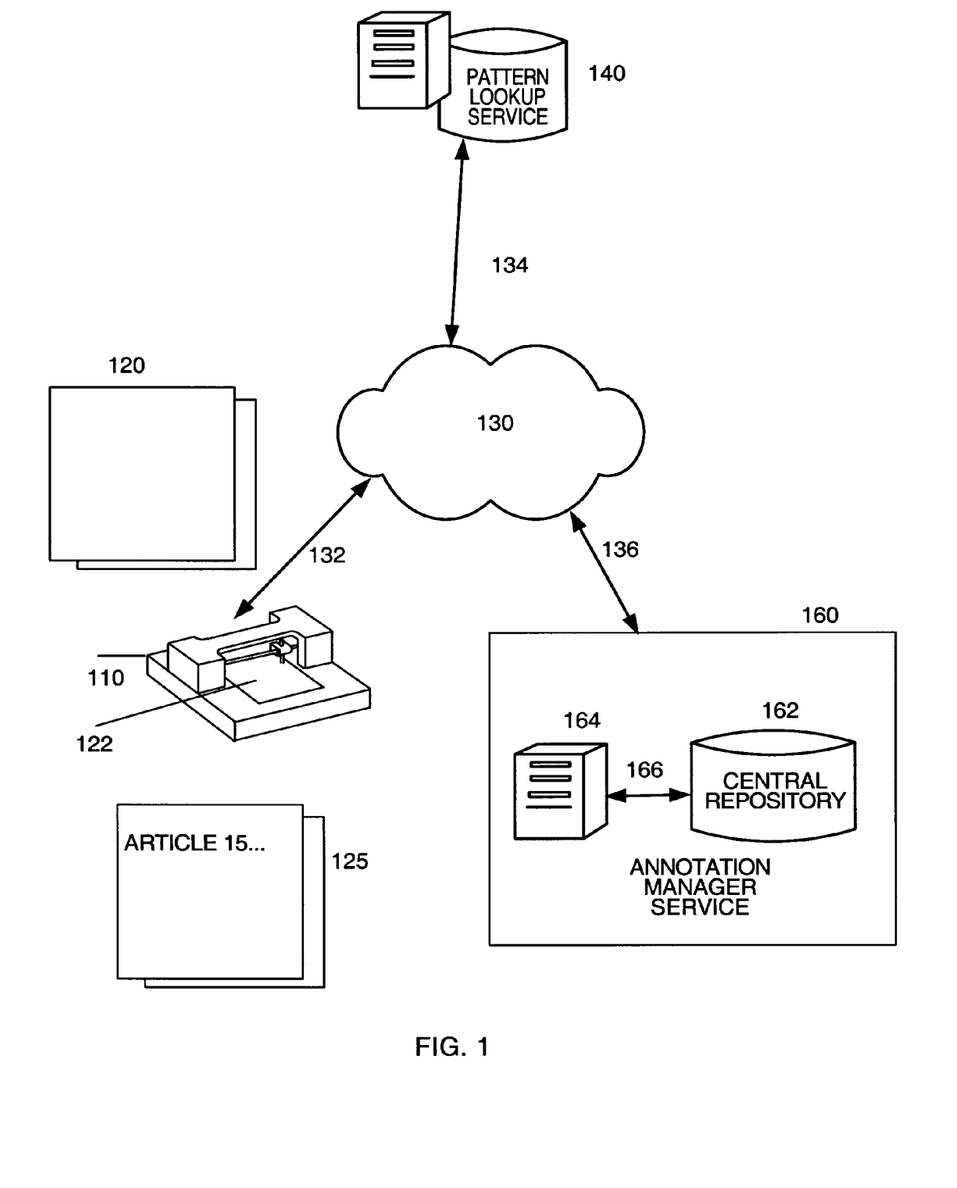
FIG. 1 is a schematic representation of an annotation management system for creating digital paper hardcopies associated with electronic documents according to an illustrative embodiment of the present application.

Referring to FIG. 1, an illustrative annotation management system for creating digital paper hardcopies associated with electronic documents according to the present application is shown. The application subsystem prints document copies for use with an annotation manager system.

The annotation manager system allows users to maintain a single centralized annotated version among the team members and ensures that annotations are reflected on the master document in a timely manner. The annotations may be updated in real time. As annotations are made on the printed hardcopies, the original electronic instance is kept up to date automatically. Metadata relating to the annotations is captured and presented in the electronic version of the document. For example, the time and date of each annotation along with an identifier of the author of the comments are provided.

In an illustrative embodiment of the present application, a special printer 110 or raster plotter is used. The system uses ANOTO Digital Pen Functionality to print on licensed ANOTO digital paper. A master electronic document exists as a WORD file in a central repository 162 of an annotation manger system 160. Alternatively, the WORD file may reside in another location such as a document management system.

Documents such as WORD data files are created using a word processing system. An instance of the WORD document is stored in the central repository 162 as an electronic master file. The repository 162 is connected to the annotation manager server 164 using an Ethernet network connection 166. Alternative topologies may be used and the repository 162 may be stored locally with the server 164. Multiple digital hardcopies 125 of the document are printed using digital paper 122. Printer 110 may concurrently encode paper 120 with digital pattern information when printing the hardcopy documents 125. Alternatively, paper 120 may be preprinted with digital pattern information and the paper is associated with the document.

In this system, a special printer 110 prints multiple hardcopies 125 of the original version of the document. The printer 110 is connected to a network 130 such as the Internet using communications channel 132. The hardcopies 125 are then periodically distributed to the collaboration team members. Alternatively, each member has a special printer for printing hardcopies 125 and receives only an electronic copy of the master document. The individual copy is then printed locally.

Each team member has a digital pen such as the ANOTO CHATPEN that they use to provide feedback and comments. When a team member annotates the hardcopy 125, the pen strokes are written on the hardcopy 125. The pen strokes are also stored in the CHATPEN along with metadata that includes time and date information as well as biometric information. Hardcopies 125 include a checkbox to indicate that the user is done annotating the document. The annotations are then sent to the annotation manager system 160.

The ANOTO pattern lookup service (PLS) 140 is connected to network 130 using communications 134. The PLS 140 provides the URL of the Annotation Manager System 160. The annotation manager system 160 is connected to the network 130 using communications channel 136 and the annotation manager system program executes on server 164.

There are several team member/user identification schemes that may be used. In one scheme, an identical pattern is used for each page of the several copies of the document, but separate uniquely identifiable pens are used to identify a particular user as the source of certain annotations. In another scheme, each copy of the document is printed using different unique patterns and generic digital pens are used. Since each user received a uniquely identifiable copy, the source of annotations may be determined. In yet another scheme, individual patterns and uniquely identifiable individual pens may be used to provide a more secure system. For example, the user would be able to use her individual pen with only her individual copy of the document.

In an alternative, the annotations are sent to the annotation manager system 160 when they are made. In another alternative, a timeout counter is used to determine when a user is finished annotating a document. In another alternative, the ANOTO pattern lookup service is provided locally with the annotation manager server 164. Furthermore, in yet another alternative, the pattern may be uniquely associated with a specific user who receives a specific unique and identifiable copy of the document.

Figure 1A:
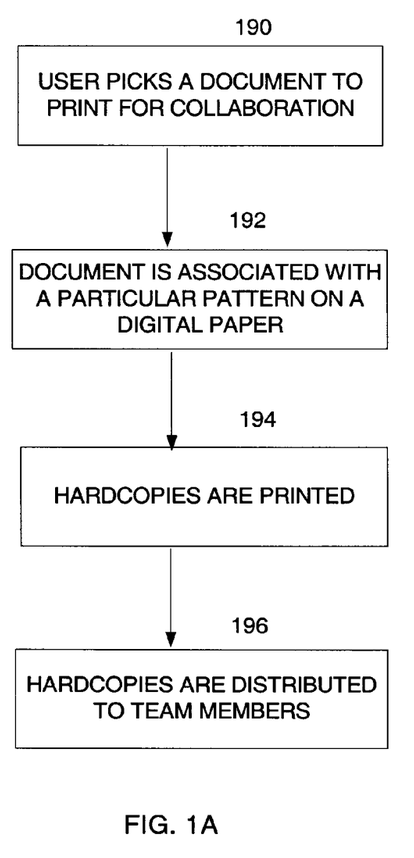
FIG. 1A is a flow chart showing a hardcopy creation process according to another illustrative embodiment of the present application.

Referring to FIG. 1A, a process for creating hardcopies associated with digital paper according to an embodiment of the present application is shown.

In step 190, the user picks a document to print for collaboration. In step 192, the document is associated with a particular pattern on a digital paper. In step 194, the hardcopies are printed and, in step 196, the hardcopies are distributed to team members.

In an alternative, each copy is printed using a unique pattern so that each user is provided a unique copy of the document that is associated with that particular user. In such instances, the underlying document is associated with several patterns in a one to many association.

Figure 2:
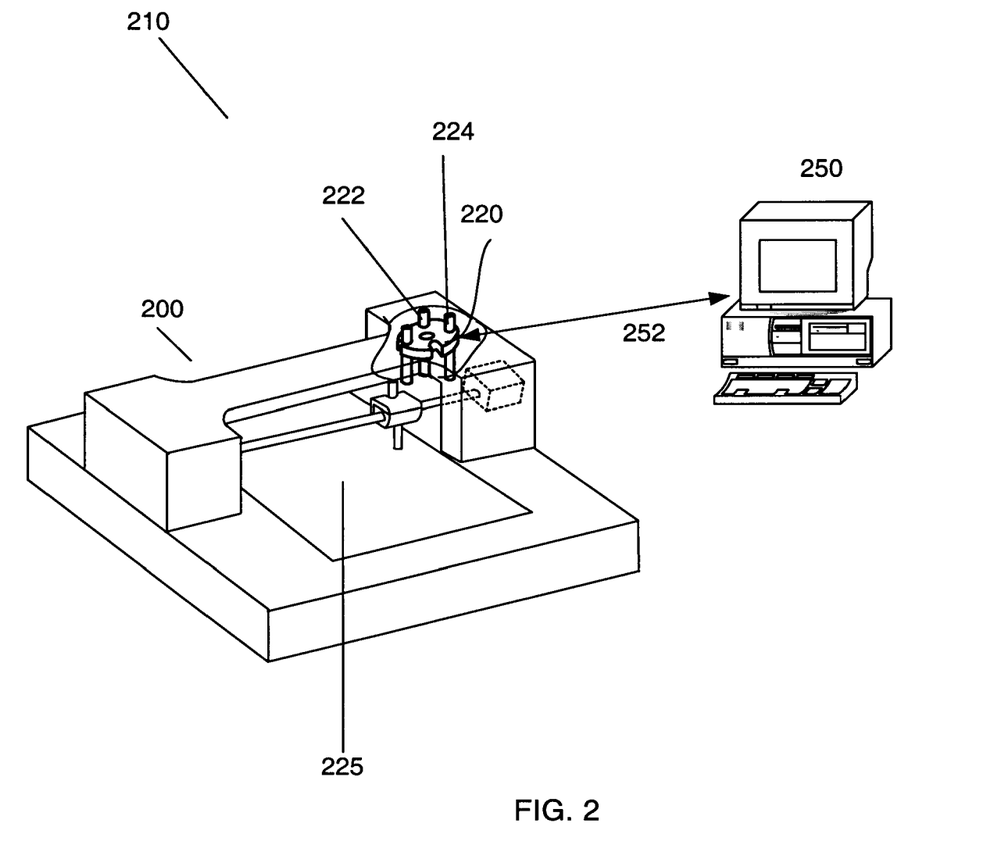
FIG. 2 is a schematic representation of a special printer used with the annotation management system of FIG. 1.

Referring to FIG. 2, a special printer used with the annotation management system as a hardcopy printing subsystem 210 is shown. A local processor 250 is connected to the annotation manager system and is connected to the printer 200 using communications channel 252. The printer 200 includes a pen cartridge 220 including a carbon based ink pen 222 that is used to print an ANOTO pattern. The cartridge 220 also includes ANOTO Pen 224 that is used with traditional ink to print the document contents on the hardcopy 225.

In this embodiment, the ANOTO pen 224 is used to associate the physical location based version of the document with the ANOTO pattern. For example, the printer 200 first prints a unique ANOTO pattern on a sheet of paper using a carbon-based ink pen 222 from the carousel. Next, the ANOTO pen 224 is selected from the carousel and used to write the document on the pattern. The ANOTO pen 224 sends pen stroke information to a back-end application that then associates the document with the actual printing location on the pattern.

In an alternative, the local processor 250 uses a WYSIWYG algorithm with a print driver to determine where individual document elements will be printed on the paper. In such a system, the pen used to print the document is a standard ink pen. The local processor also maintains the geographic location of the pattern being printed on the paper. The system then associates the two layouts to allow the system to associate a particular document element with a particular portion of the pattern space.

In yet another alternative, the local processor receives a document for use with the centralized annotation manager system. The local processor associates a pattern with the document and prints the local copy of the document for the particular user by using locally generated ANOTO pattern to create a localized copy of the document. In such a system, the local processor selects a pattern for the local user and the particular copy is associated with that user. Each user has a similar individualized local system. Each local system then manages recognizing annotation input from a user and sends that annotation data to the centralized system. In another alternative, the local system sends pattern information to the centralized system and the user input is processed centrally as discussed above.

Figure 3:
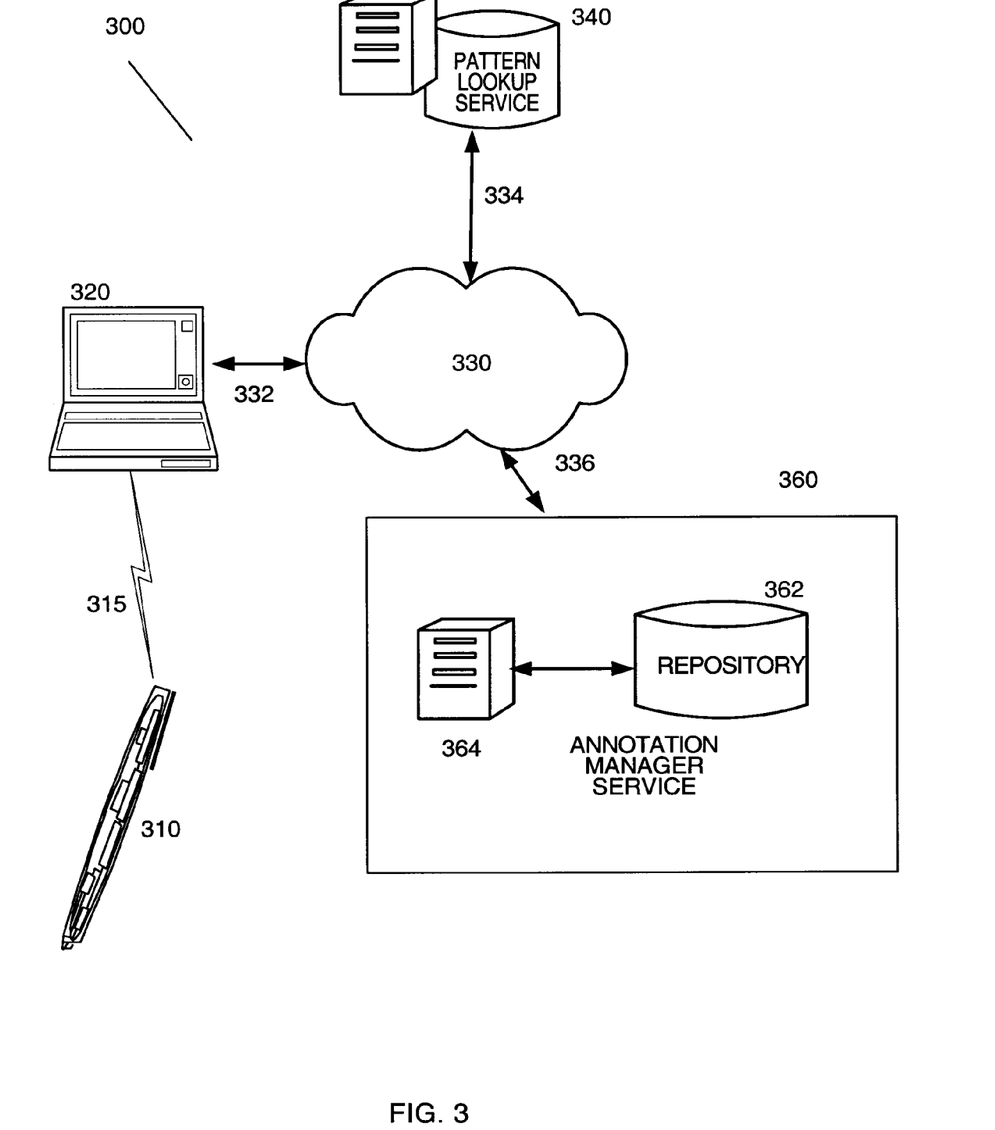
FIG. 3 is a schematic representation of an annotation management system for receiving annotations from digital pens according to an illustrative embodiment of the present application.

Referring to FIG. 3, an annotation management system 300 for receiving annotations from digital pens according to an illustrative embodiment of the present application is shown.

An ANOTO CHATPEN 310 uses a local laptop 320 as a collocated local processor connected using a BLUETOOTH personal area network 315. The laptop 320 is connected to a network 330 such as the Internet using communications channel 332. The communications channel 332 is a wireless network but could alternatively be any communications channel such as a wired Ethernet connection. An ANOTO Pattern Lookup Service PLS 340 is connected to network 330 using communications channel 334. The annotation manager service 360 includes a central repository 362 and server 364 connected to network 330 using communications channel 336. Alternatively, each of the connections may utilize a single local Ethernet Local Area Network (LAN).

Pen 310 includes a processor, memory, ink, a camera or image sensor, a battery and a BLUETOOTH transceiver. It also includes biometric sensors. Laptop 320 includes a mobile Pentium 4 processor. The server processors 340, 364 are geographically and load balanced application servers including systems available from Sun Microsystems. The storage servers use multiple location redundant backup systems. Alternatively, other appropriate wireless and wired networks and connections may be utilized. Each user registers the ANOTO CHATPEN and provides a biometric sample such as a signature. In this embodiment, appropriate security is utilized including security at the application layer.

The embodiments described herein may utilize biometric data for purposes such as identification and authentication of a user. The pen 310 provides biometric data relating to the pen strokes used including hand speed, pen tip pressure and the inclination angle between pen and paper. The pen 310 is assigned a unique identification code that is a unique serial number for the pen 310. Such code may also be used to identify a team member.

Figure 3A:
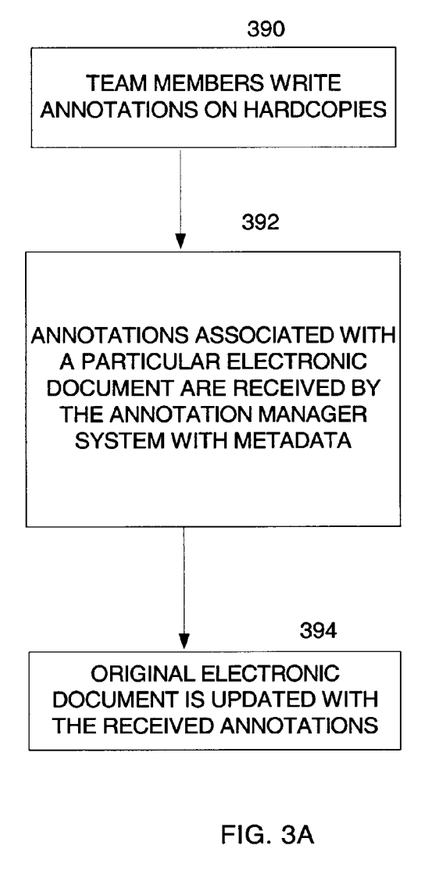
FIG. 3A is a flow chart showing an annotation management process according to another illustrative embodiment of the present application.

Referring to FIG. 3A, a process for managing annotations associated with digital paper according to an embodiment of the present application is shown.

In step 390, team members write annotations on hardcopies. In step 392, the annotations associated with a particular electronic document are received by the annotation manager system with metadata. Each user has a unique pen and the annotations are associated with a particular user. In step 394, the original electronic document is updated with the received annotations.

In an alternative, each document is printed with a unique pattern and a generic pen is used. Accordingly, the annotations may be associated with a particular user because the system stores information regarding which user received a particular copy of the document.

Figure 4:
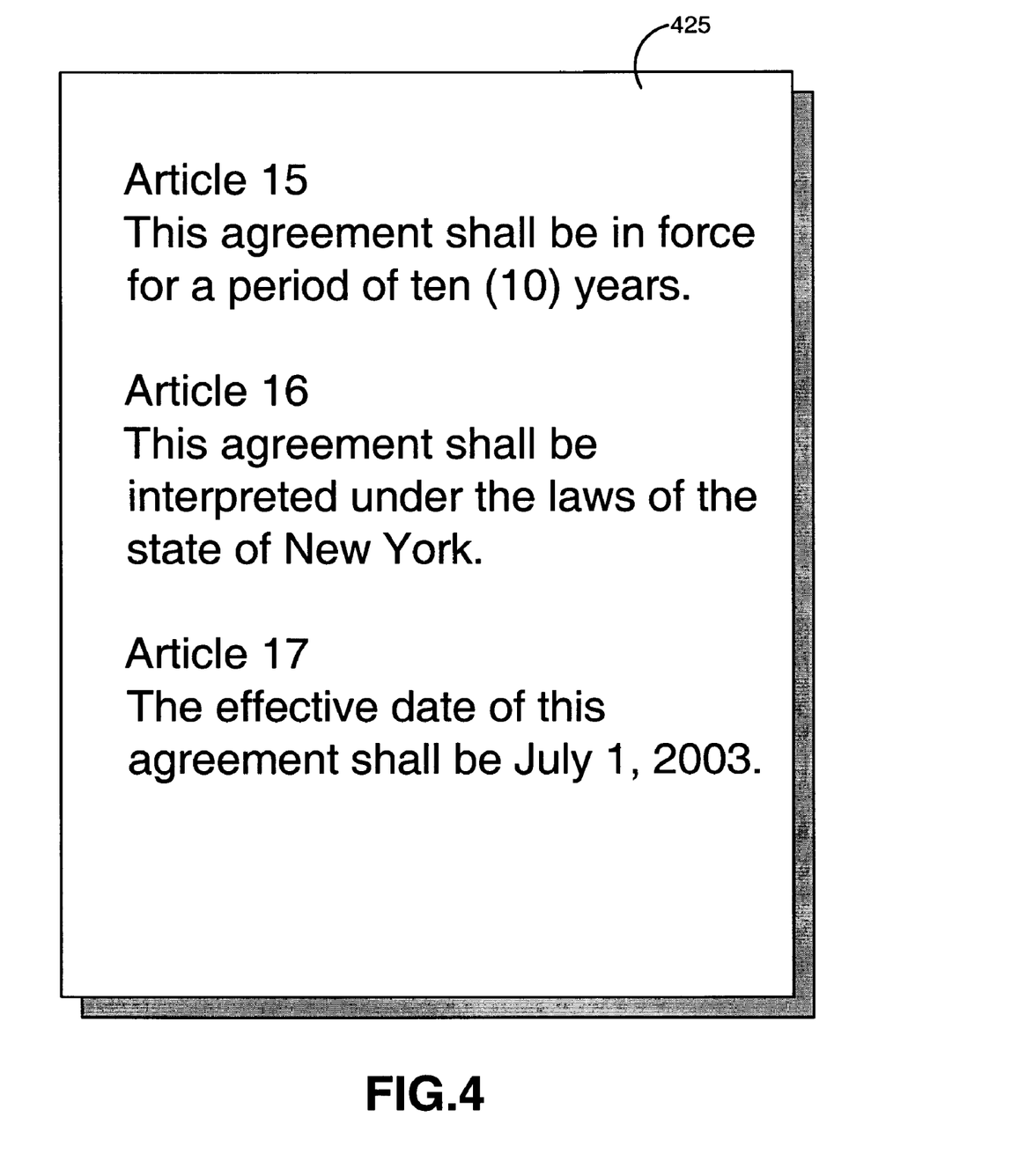
FIG. 4 is a schematic representation of an illustrative document used in accordance with an embodiment of the present application.

Referring to FIG. 4, an illustrative document used in accordance with an embodiment of the present application is shown. Document 425 is an original draft of a contract document.

Figure 5:
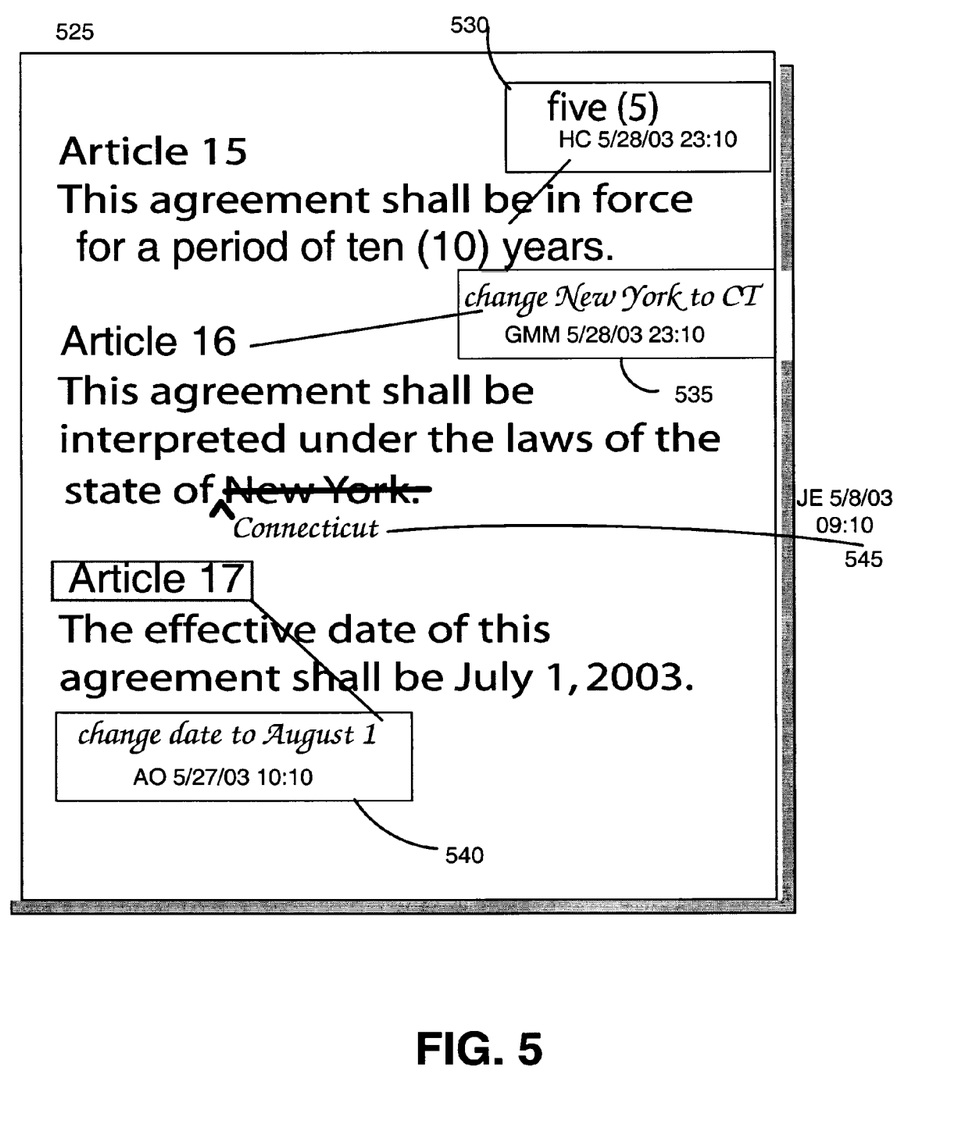
FIG. 5 is a schematic representation of an illustrative document used in accordance with an embodiment of the present application.

Referring to FIG. 5, an illustrative document used in accordance with an embodiment of the present application is shown. Document 525 is a subsequent draft of the original draft of a contract document 425. The document includes annotations 530, 535 and 540. The document 525 includes edit 545 that changes the state from New York to Connecticut. Annotations 530, 535, and 540 are anchored to their respective paragraphs. Accordingly, if a paragraph is moved, the annotation will move with it. Annotation 520 is anchored to the two words shown. Annotations 535 and 540 are anchored to the paragraph headings.

In the illustrative embodiments described herein, a single page contract is utilized to illustrate the operation of the system. However, multi-page documents may also be utilized. In another alternative, a bitmap printer such as a laser printer or an inkjet printer is utilized to print both an underlying ANOTO pattern and a document.

Multiple copies of the same contract may be printed using the same ANOTO pattern space. Individual comments are identified using the unique identifying characteristics of the ANOTO CHATPEN as it annotates a particular copy of the contract. In a related alternative, each copy of the contract may be printed using a different ANOTO pattern space. In such an alternative system, the master document would be associated with each of the ANOTO pattern space areas used to print the multiple copies.

In another alternative embodiment, the same ANOTO pattern space is used for each piece of paper utilized by the current user of the annotation manager system. A traceable identifier code is printed on the document hardcopy. The user then traces the code with the digital pen to create the association between that digital paper annotation session and the electronic master document.

In another alternative embodiment, the system determines if there is overlap or conflict amongst various annotations. If an overlap or conflict is detected, tactile/haptic feedback is provided to the user by vibrating the pen. The user will then have an opportunity to review the central document using a computer before annotating that section.

Annotation Manager System with Metadata

In another illustrative embodiment of the present application, a system for managing document annotations is described that also provides metadata for each annotation. The annotation manager system associates each annotation with an area of the original document. The digital pen provides additional information regarding the annotations as metadata. As shown in FIG. 5, annotations 530, 535, and 540 each include metadata regarding the author and time and date of the annotation. The metadata for edit 545 is omitted from the figure but would be displayed in a comment box.

Annotation Manager System with Annotation Anchoring

In another illustrative embodiment of the present application, the annotation manager system receives annotation input from a digital pen such as the ANOTO CHATPEN system.

A typical WORD document is presented in WORD in a What You See Is What You Get (WYSIWYG) format. Such a system considers the currently selected printer settings along with the traditional document formatting settings to determine the physical layout document presentation. The document is live and may be edited, as particular symbols and formatting codes are associated with a display location. In contrast, a bitmapped-scanned document exists only as an image file unless the character data is recognized using an optical character recognition (OCR) program.

As shown in FIG. 5, annotation 530 has been processed using OCR before it was entered in the document 525. The annotation manager system uses annotation position data to determine which paragraph of the original document 425 is associated with the annotation. It then anchors the annotation to that paragraph.

Annotation Manager System with Editing and Reviewer Hierarchy

In another illustrative embodiment of the present application, the annotation manager system processes editing annotations using a hierarchal system. The annotations are parsed to recognize editing symbols that are used to automatically incorporate changes to the electronic master document file. For example, an annotation consisting of a line through a word will delete the word in the electronic master copy. A carrot symbol is used to insert text. The inserted text is recognized using handwriting OCR. In an alternative, the editing commands are processed using the track changes functionality of WORD.

Figure 6:
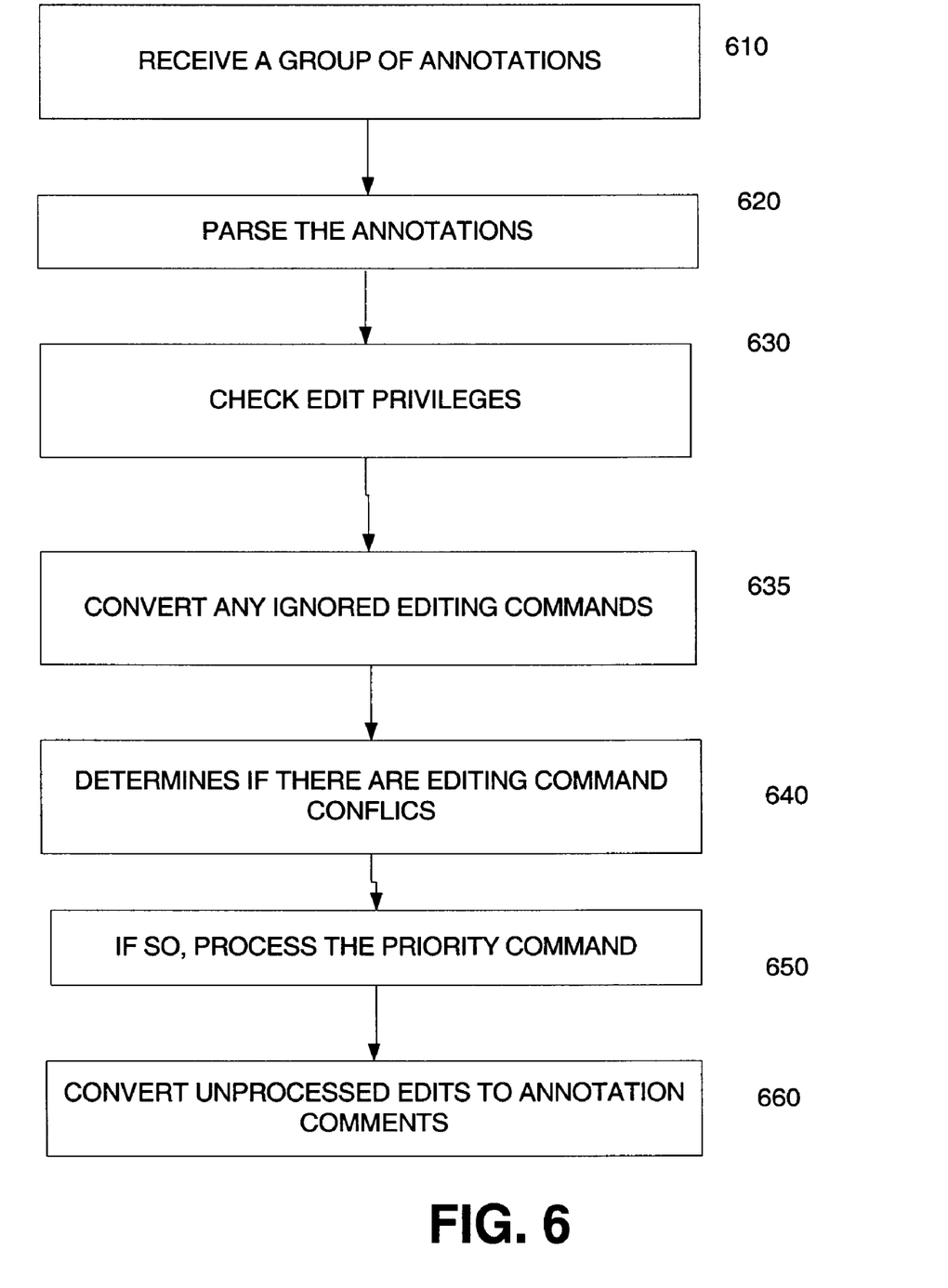
FIG. 6 is a flow chart showing a hierarchal permission process according to another illustrative embodiment of the present application.

Referring to FIG. 6, a flowchart of a hierarchal permission system according to an embodiment of the present application is shown. A hierarchal permission system is utilized to determine which team members may change the document and which members may only enter comments. Additionally, if two team members with change authority attempts to change the same paragraph, the changes from the highest-ranking team member are entered and the others are converted into comments.

The editing system is an application running on the annotation manager infrastructure described above. In step 610, a group of annotations are received. In step 620, the annotations are parsed and any control annotations are recognized. In step, 630, the system determines if any users having only comment privileges entered any editing commands. If so, in step 635, those editing commands are ignored and the edits are converted to comment annotations.

In step 640, the system determines if there are any groups of editing commands that operate on the same portion of the original electronic master document. If so, in step 650, the edits are prioritized and only the one edit with highest priority is selected. In step 660, any edits that are not processed due to the hierarchy test are converted to annotation comments.

Digital Paper Scanner Used for Association

In another alternative, a digital paper scanner is used when printing the hardcopies in order to associate a particular digital paper identifier with the electronic master document. The digital paper identifier may be a unique pattern space that is scanned by the digital pen. In order to accommodate multiple page documents, each page of the digital paper may use a different pattern space and may be scanned as printed. Alternatively, the digital paper sheets may be provided in sequence and only the first page scanned. In that way, each printed page of the hardcopy document will be associated with a different digital paper pattern space.

Referring again to FIG. 1, a traditional laser printer is utilized as an alternative to special printer 110. In order to associate a particular sheet of digital paper with the electronic master document, a digital pen or other pattern scanner is used to identify the paper before it is placed in the traditional printer. Once the digital paper is identified, the hardcopy of the document is printed and the association with the digital paper is established in the annotation manager service database.

Reviewer Audit System

In another illustrative embodiment of the present application, the annotation manager system is adapted to audit certain characteristics of a reviewer who is engaged in document review.

Several groups of people routinely review documents written by others. For example, professors often use graders to grade papers or exams submitted in courses having a large number of students. Similarly, editors review material for articles and books. Furthermore, certain reviewers may be compensated based upon the amount of time spent reviewing a document. For example, an attorney may be compensated hourly for reviewing a draft appellate brief.

It may be advantageous to provide a report detailing the amount of time spent reviewing such a document. Accordingly, in an alternative embodiment using any of the annotation manager systems described, a reviewer audit system is described. The document annotation manager is modified to audit the performance of a document reviewer such as a person that is grading papers or a professional editor that is reviewing a work. The reviewer is instructed to check passages or paragraphs during the review and the time-stamp system of the annotation manager records the time stamp entries for each annotation as the reviewer proceeds through the document. Accordingly, an audit trail is created that may be manually or automatically audited for compliance with a set of review rules.

Figure 7:
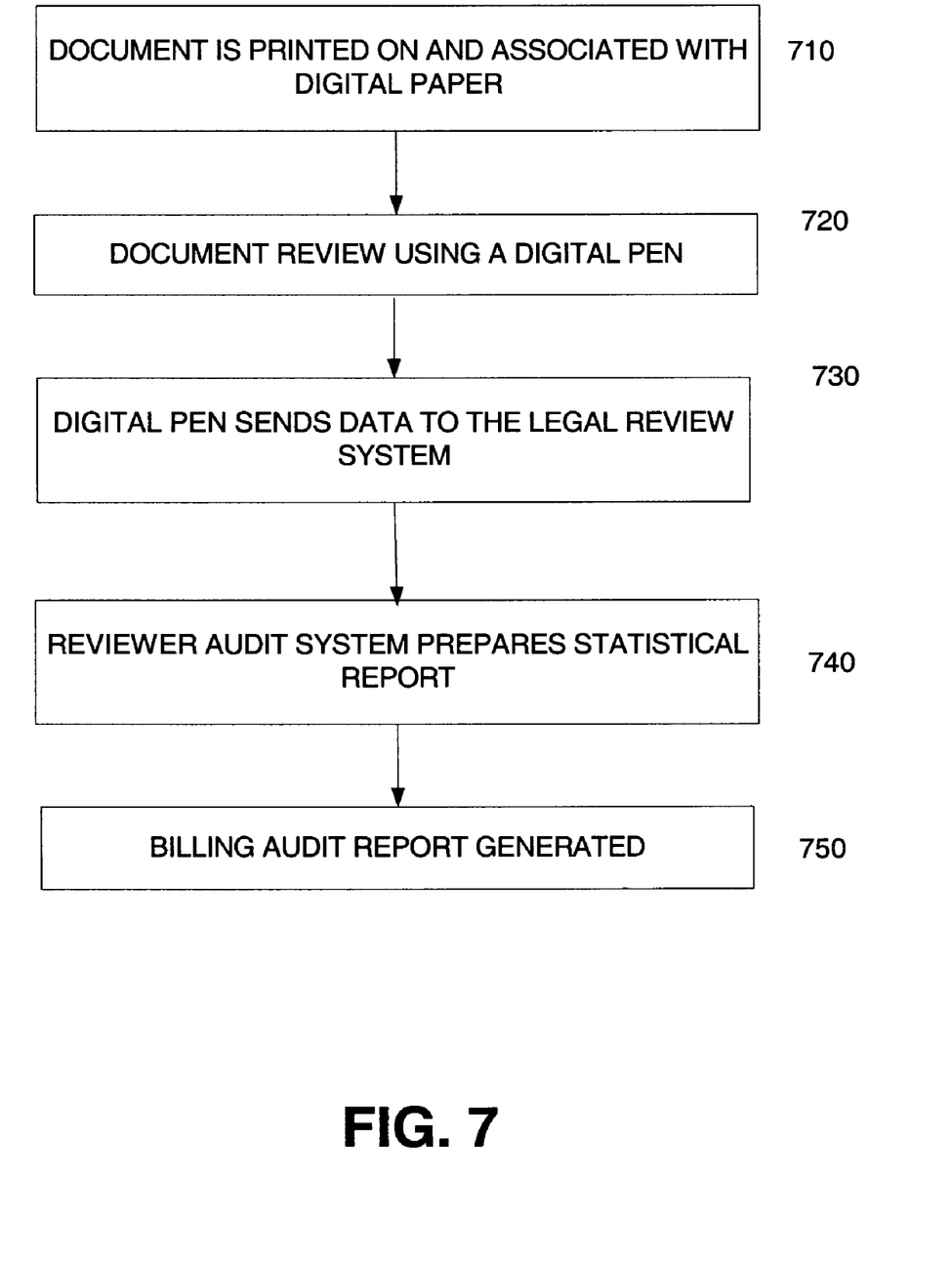
FIG. 7 is a flow chart showing a process for reviewer audit according to another illustrative embodiment of the present application.

Referring to FIG. 7, a flowchart of a reviewer audit system according to an embodiment of the present application is shown. The system is an application running on the annotation manager infrastructure described above. In step 710, an examination paper is printed on and associated with digital paper, leaving space for answers. The report includes grade boxes next to each exam question. In step 720, the grader grades the paper using a digital pen. The grader considers that answer to each question and places a grade in the grade box. At step 730, the grader docks the digital pen so that the pen initiates a communication session with the reviewer audit system. At step 740, the reviewer audit system generates a grading report that describes the amount of time spent reviewing each question by using the time stamps associated with the review. If multiple graders are used, a statistical analysis comparing the graders is provided.

Optionally, at step 750, the reviewer audit system prepares a billing report listing the expected number of hours for each activity of the reviewer during a period along with the actual time spent. Such a report could be used in auditing the monthly bill of the reviewer.

Non-Repudiated Legal Review

Due to the occurrence of several high profile corporate scandals, the Sarbanes-Oxley Act of 2002 (the Act) imposed certain duties and obligations on board members and other individuals representing certain companies.

In accordance with section 302 of the Act, the CEO and CFO of each issuer must prepare a statement to accompany each audit report to certify the appropriateness of the financial statements and disclosures contained in the periodic report. They certify that those financial statements and disclosures fairly present, in all material respects, the operations and financial condition of the issuer.

It may be advantageous to provide a certain level of certainty that a particular individual reviewed a document. For example, a CFO may rely upon an audit manager to review documents. The CFO may desire a record of review of a particular document or group of documents that the audit manager could not repudiate.

Figure 8:
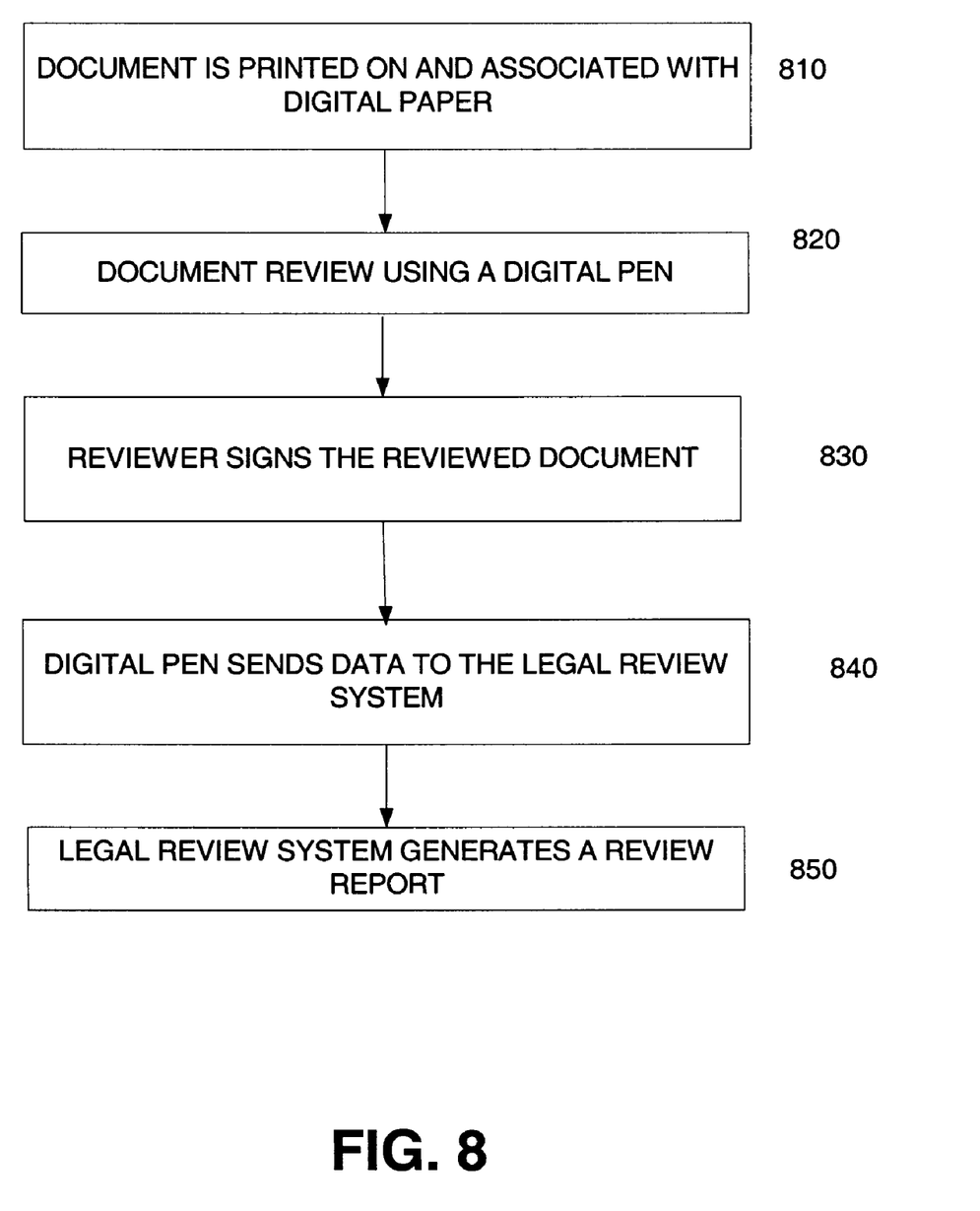
FIG. 8 is a flow chart showing a process for legal review according to another illustrative embodiment of the present application.

Referring to FIG. 8, a flowchart of a legal review system according to an embodiment of the present application is shown. Accordingly, in an alternative embodiment using any of the annotation manager systems described, a legal review non-repudiation review system is described. The system is an application running on the annotation manager infrastructure described above. In step 810, a financial report is printed on and associated with digital paper. The report optionally includes check boxes after each paragraph or section. Additionally, a signature box is included at the end of the document. In step 820, the audit manager reviews the document using a digital pen. The audit manager checks the review check boxes if they are available during the review or checks the digital paper near each section or paragraph.

At step 830, the audit manager signs the reviewed document in the signature box. At step 840, the audit manager docks the digital pen so that the pen initiates a communication session with the legal review system. In an alternative, the digital pen communicates with the legal review system through a real-time communications channel such as a BLUETOOTH link to a cellular telephone that communicates with the legal review system. At step 850, the legal review system generates a review report that describes the level of authentication of the digital pen user and a report of time stamps associated with the review.

Optionally, the legal review system will apply a set of rules in order to flag suspicious activity. For example, the legal review system may expect that the audit manager should spend at least two minutes reviewing a particular section. If the report shows that the boxes were checked in two-second intervals, a red flag will be reported. The levels of authentication used include at least a first level that includes a unique pen identifier that is associated with a user and a second level that includes biometric authentication of the user signature or writing sample against a known reference.

Multiple Source Annotation Manager

Commonly owned, co-pending U.S. patent application Ser. No. 10/389,498, filed Mar. 14, 2003 describes a Method For Managing The Annotation Of Documents and is incorporated herein by reference. The embodiments of the application may be combined with the embodiments described herein to extend the annotation manager system to include multiple annotation sources.

Commonly owned, co-pending U.S. patent application Ser. No. 10/065,284, filed Sep. 30, 2002 describes methods and systems for remote form completion and is incorporated herein by reference. Commonly owned, co-pending U.S. patent application Ser. No. 10/065,281, filed Sep. 30, 2002 describes methods and systems for creating and sending facsimiles using a digital pen and is incorporated herein by reference.

The illustrative embodiments of the present application are described with reference to a word processing system such as the MICROSOFT® WORD system. However, the embodiments of the present application may be used with other document creation and editing systems such as CAD systems and presentation systems including MICROSOFT® POWERPOINT. The systems described herein may be implemented using computer software development systems such as MICROSOFT VISUAL STUDIO® and using programming languages such as C and C++ with appropriate libraries. Similarly, a commercial product modification tool such as VISUAL BASIC APPLICATIONS (VBA) may be used to modify a commercial application such as WORD. Alternatively, an open source system such as OPEN OFFICE may be modified to perform the functions described herein.

The processing systems used are typically INTEL PENTIUM® based personal computer, but other computers such as MACINTOSH APPLE computers may be used. Similarly, the processing systems may include, but are not limited to, data processors, keyboards, dictation equipment, drawing tablets, pointing devices, mobile computers, tablet computers, Personal Digital Assistants (PDA), cell phones and digital pens.

The illustrative embodiments described herein utilize the ANOTO CHATPEN system. However, other digital pens may be utilized. Certain digital pen systems utilize an imaging device to scan or record an image of the pen stroke. Other digital pens use mechanical sensors in order to record a pen stroke. Digital pen systems may utilize positioning systems such as light-based scanning systems including infrared (IR) sources and detectors in order to determine an absolute or relative position of the pen. Those pen systems and the digital pen systems include the LOGITECH IO pen system from Logitech of Freemont, Calif., the N-SCRIBE system available from Digital Ink of Wellesley, Mass. and the E-PEN system available from E-Pen InMotion of Matam, Haifa Israel may be utilized. Similarly, digital pointing device systems including the V-PEN system available from OTM Technologies of Herzliya Israel may be used.

The present application describes illustrative embodiments of a system and method for annotating documents. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

The invention claimed is:

1. A method for managing the annotation of a document comprising:

obtaining an original document;

making an original electronic version of the document available to an annotation manager system;

associating the original electronic version of the document with digital paper;

receiving a plurality of annotations from a plurality of team members each using a hardcopy of the original electronic version of the document that was printed on the associated digital paper;

receiving annotation author identification data for identifying associating each of the plurality of annotations with the team member who created the annotation;

obtaining hierarchal permission data for each team member;

determining for each annotation if such annotation is an authorized annotation using the hierarchal permission data;

associating each authorized annotation with a location in the original electronic version of the document;

creating a new annotated version of the original electronic version of the document incorporating the authorized annotations;

parsing the annotations for at least one editing command;

determining an authorization level for the at least one editing command; and if the authorization level for the at least one editing command is below an authorization threshold, converting the at least one editing command into an annotation.

2. The method of claim 1, further including:

converting non-priority editing commands into annotations.

3. A method for managing the annotation of a document comprising:

obtaining an original document;

making an original electronic version of the document available to an annotation manager system;

associating the original electronic version of the document with digital paper;

receiving a plurality of annotations from a plurality of team members each using a hardcopy of the original electronic version of the document that was printed on the associated digital paper;

receiving annotation author identification data for identifying associating each of the plurality of annotations with the team member who created the annotation;

associating each annotation with a location in the original electronic version of the document;

obtaining hierarchal priority data for the team members;

determining if any two of the annotations overlap, and if so, selecting one of the two overlapping annotations using the hierarchal data;

creating a new annotated version of the original electronic version of the document incorporating the non-overlapping annotations and the selected overlapping annotations.

* * * * *